US010024304B2

United States Patent
Lee

(10) Patent No.: US 10,024,304 B2
(45) Date of Patent: Jul. 17, 2018

(54) SYSTEM AND METHODS FOR CONTROLLING NOISE PROPAGATION OF WIND TURBINES

(71) Applicant: General Electric Company, Schenectady, NY (US)

(72) Inventor: Seongkyu Lee, Niskayna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 386 days.

(21) Appl. No.: 14/718,833

(22) Filed: May 21, 2015

(65) Prior Publication Data

US 2016/0341180 A1  Nov. 24, 2016

(51) Int. Cl.
*F03D 7/02* (2006.01)
*F03D 9/25* (2016.01)

(52) U.S. Cl.
CPC ......... *F03D 7/0296* (2013.01); *F03D 7/0204* (2013.01); *F03D 7/0224* (2013.01); *F03D 9/25* (2016.05); *F05B 2260/821* (2013.01); *F05B 2270/333* (2013.01); *Y02E 10/723* (2013.01)

(58) Field of Classification Search
None
See application file for complete search history.

(56) References Cited

U.S. PATENT DOCUMENTS

| | | | |
|---|---|---|---|
| 6,004,095 A | 12/1999 | Waltz et al. | |
| 7,484,363 B2 | 2/2009 | Reidy et al. | |
| 7,763,989 B2 | 7/2010 | Kinzie et al. | |
| 7,945,350 B2 | 5/2011 | Kinzie et al. | |
| 7,988,414 B2 | 8/2011 | Benito et al. | |
| 8,008,794 B2 | 8/2011 | Edenfeld | |
| 8,035,241 B2 | 10/2011 | Subramanian et al. | |
| 8,047,783 B2 | 11/2011 | Nies et al. | |
| 8,162,610 B1 | 4/2012 | Khozikov et al. | |
| 8,215,907 B2 * | 7/2012 | Kooijman | F03D 7/0212 416/1 |

(Continued)

FOREIGN PATENT DOCUMENTS

| | | |
|---|---|---|
| CN | 101818722 A | 9/2010 |
| CN | 101907062 A | 12/2010 |

(Continued)

OTHER PUBLICATIONS

Heimann et al (The wake of a wind turbine and its influence on sound propagation; Meteorologische Zeitschrift; 2011).*

(Continued)

*Primary Examiner* — Justin Seabe
*Assistant Examiner* — Juan G Flores
(74) *Attorney, Agent, or Firm* — GE Global Patent Operation; Nitin Joshi

(57) ABSTRACT

A method of controlling a wind turbine includes obtaining weather data indicative of one or more weather conditions at the wind turbine, estimating wake profiles based on the obtained weather data, estimating far-field sound propagation in a direction of a noise sensitive site based on the estimated wake profiles, generating a yaw signal, wherein the yaw signal controls the yaw of a nacelle relative to a tower of the wind turbine, estimating a noise level at the noise sensitive site, and adjusting the yaw signal if the estimated noise level at the noise sensitive site exceeds a threshold noise level.

12 Claims, 6 Drawing Sheets

(56) References Cited

U.S. PATENT DOCUMENTS

| | | |
|---|---|---|
| 8,221,075 B2 | 7/2012 | Nies et al. |
| 8,246,312 B2 | 8/2012 | Schubert |
| 8,258,643 B2 | 9/2012 | Bonnet |
| 8,321,062 B2 | 11/2012 | Nies et al. |
| 8,338,978 B2 | 12/2012 | Yasugi et al. |
| 8,344,533 B2 | 1/2013 | Edenfeld |
| 8,347,501 B2 | 1/2013 | Petersen |
| 8,426,994 B2 | 4/2013 | Nielsen et al. |
| 8,427,649 B2 | 4/2013 | Hays et al. |
| 8,608,046 B2 | 12/2013 | Laurent et al. |
| 8,616,846 B2 | 12/2013 | Nanukuttan et al. |
| 8,779,617 B2 | 7/2014 | Egedal et al. |
| 8,797,550 B2 | 8/2014 | Hays et al. |
| 8,810,796 B2 | 8/2014 | Hays et al. |
| 9,201,410 B2 * | 12/2015 | Ambekar ............ G05B 13/04 |
| 2006/0275121 A1 | 12/2006 | Merswolke et al. |
| 2007/0031237 A1 | 2/2007 | Bonnet |
| 2007/0124025 A1 | 5/2007 | Schram et al. |
| 2009/0099702 A1 | 4/2009 | Vyas et al. |
| 2010/0013224 A1 | 1/2010 | Edenfeld |
| 2010/0135798 A1 | 6/2010 | Eggleston |
| 2010/0143117 A1 | 6/2010 | Xiong |
| 2010/0148515 A1 | 6/2010 | Geddry et al. |
| 2010/0187828 A1 | 7/2010 | Reidy et al. |
| 2010/0215502 A1 | 8/2010 | Harrison |
| 2011/0142619 A1 | 6/2011 | Subramanian et al. |
| 2011/0163147 A1 | 7/2011 | Laurent et al. |
| 2011/0164783 A1 | 7/2011 | Hays et al. |
| 2011/0223018 A1 * | 9/2011 | Srinivasan ............ F03D 7/0296 416/1 |
| 2011/0291416 A1 | 12/2011 | Edenfeld |
| 2012/0050750 A1 | 3/2012 | Hays et al. |
| 2012/0061957 A1 | 3/2012 | Steinmetz et al. |
| 2012/0134813 A1 | 5/2012 | Hies et al. |
| 2012/0139244 A1 | 6/2012 | Bonnet |
| 2012/0146331 A1 | 6/2012 | Egedal et al. |
| 2012/0156036 A1 | 6/2012 | Smith et al. |
| 2012/0169053 A1 | 7/2012 | Tchoryk, Jr. et al. |
| 2012/0256424 A1 | 10/2012 | Marin |
| 2012/0274937 A1 | 11/2012 | Hays et al. |
| 2013/0103202 A1 | 4/2013 | Bowyer et al. |
| 2013/0140818 A1 | 6/2013 | Matesanz Gil |
| 2013/0154263 A1 | 6/2013 | Attia |
| 2013/0156577 A1 | 6/2013 | Esbensen et al. |
| 2013/0166082 A1 * | 6/2013 | Ambekar ............ G05B 13/04 700/287 |
| 2013/0175871 A1 | 7/2013 | Knüppel et al. |
| 2013/0181450 A1 | 7/2013 | Narayana et al. |
| 2013/0209220 A1 | 8/2013 | Nielsen |
| 2013/0272844 A1 | 10/2013 | Lobato Peña et al. |
| 2013/0300115 A1 | 11/2013 | Seem et al. |
| 2013/0314694 A1 | 11/2013 | Tchoryk, Jr. et al. |
| 2013/0334817 A1 | 12/2013 | Scholte-Wassink |
| 2014/0017080 A1 | 1/2014 | Porm et al. |
| 2014/0028495 A1 | 1/2014 | Schroeder et al. |
| 2014/0028496 A1 | 1/2014 | Schroeder et al. |
| 2014/0037447 A1 | 2/2014 | Attia |
| 2014/0061279 A1 | 3/2014 | Laurent et al. |
| 2014/0207297 A1 | 7/2014 | Betran Palomas |
| 2014/0232113 A1 | 8/2014 | Egedal et al. |
| 2014/0234103 A1 | 8/2014 | Obrecht |
| 2014/0248148 A1 | 9/2014 | Abdallah et al. |
| 2014/0361537 A1 | 12/2014 | Andresen et al. |
| 2014/0377065 A1 | 12/2014 | Matesanz |
| 2015/0071778 A1 | 3/2015 | Delport et al. |

FOREIGN PATENT DOCUMENTS

| | | | |
|---|---|---|---|
| CN | 202117990 U | 1/2012 | |
| CN | 102913399 A | 2/2013 | |
| CN | 103020462 A | 4/2013 | |
| CN | 202974425 U | 6/2013 | |
| EP | 2306004 A2 | 4/2011 | |
| EP | 2469081 A2 * | 6/2012 | ........ F03D 7/0296 |
| EP | 2599993 A1 | 6/2013 | |
| JP | 2010216307 A | 9/2010 | |
| JP | 2010216308 A | 9/2010 | |
| WO | 2009047061 A1 | 4/2009 | |
| WO | 2010061255 A2 | 6/2010 | |
| WO | 2010062788 A2 | 6/2010 | |
| WO | 2011079323 A1 | 6/2011 | |
| WO | 2012105973 A1 | 8/2012 | |

OTHER PUBLICATIONS

European Search Report and Opinion issued in connection with corresponding EP Application No. 16170167.7 dated Oct. 7, 2016.

Yang, Zhongzhou, et al., Model predictive control for wind turbine load reduction under wake meandering of upstream wind turbines, American Control Conference (ACC), 2012, IEEE, Jun. 27-29, 2012, pp. 3008-3013.

Larsson et al., "Sound Propagation from Wind Turbines under Various Weather Conditions", Uppsala University, Disciplinary Domain of Science and Technology, Earth Sciences, Department of Earth Sciences, LUVAL, 5th International Conference on Wind Turbine Noise, Denver, USA, 15 pages, 2013.

* cited by examiner

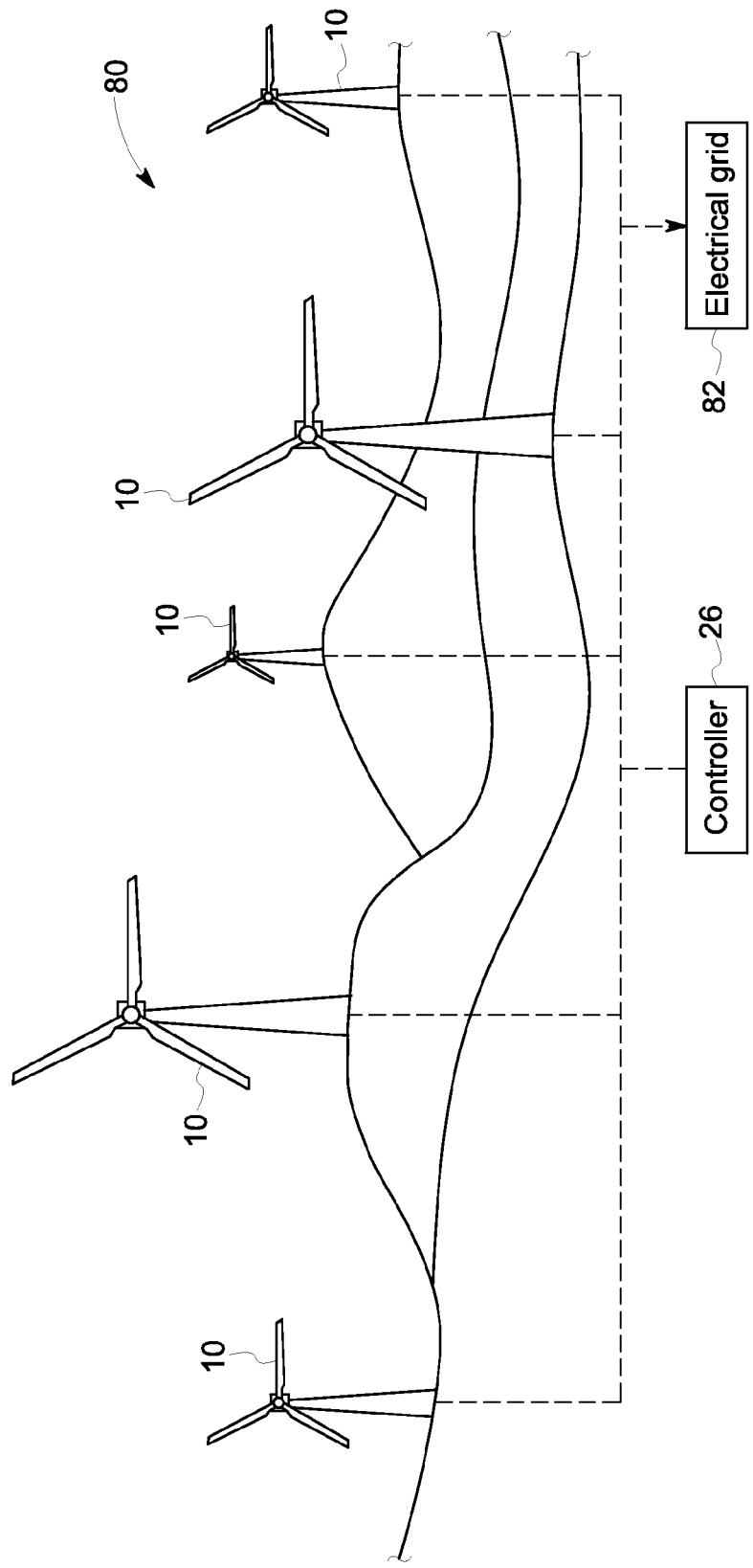

SYSTEM AND METHODS FOR CONTROLLING NOISE PROPAGATION OF WIND TURBINES

BACKGROUND

The subject matter disclosed herein relates to wind turbines, and specifically to the propagation of noise created by wind turbines.

Wind turbines typically include multiple blades extending from a central hub. The hub is rotatably coupled to a nacelle suspended above the ground by a tower. Generally, the nacelle houses an electric generator coupled to the hub and configured to generate electrical power as the blades are driven to rotate by the wind. Wind turbine blades are typically designed and manufactured to efficiently transfer wind energy into rotational motion, thereby providing the generator with sufficient rotational energy for power generation.

Wind power plants typically consist of multiple wind turbines of this type spread over a given geographic region. Wind passing over the region causes blades associated with each wind turbine to rotate, thereby generating electrical power. Noise generated by a wind turbine, or a group of wind turbines, may propagate long distances, in some cases a few kilometers. Sound propagation may be influenced by environmental conditions such as wind, temperature, atmospheric turbulence, terrain, etc. Because of local regulations, the presence of nearby residents, or other factors, an operator may desire to operate one or more wind turbines such that the noise level at one or more acoustic receptors remains below a specified noise level.

BRIEF DESCRIPTION

Certain embodiments commensurate in scope with the original claims are summarized below. These embodiments are not intended to limit the scope of the claims, but rather these embodiments are intended only to provide a brief summary of possible forms of the claims. Indeed, the claims may encompass a variety of forms that may be similar to or different from the embodiments set forth below.

In one embodiment, a method of controlling a wind turbine includes obtaining weather data indicative of one or more weather conditions at the wind turbine, estimating wake profiles based on the obtained weather data, estimating far-field sound propagation in a direction of a noise sensitive site based on the estimated wake profiles, generating a yaw signal, wherein the yaw signal controls the yaw of a nacelle relative to a tower of the wind turbine, estimating a noise level at the noise sensitive site, and adjusting the yaw signal if the estimated noise level at the noise sensitive site exceeds a threshold noise level.

In a second embodiment, a method of controlling a wind turbine includes obtaining weather data indicative of one or more weather conditions at the wind turbine, estimating wake profiles based on the obtained weather data, estimating sound propagation in a direction of an acoustic receptor based on the estimated wake profiles, identifying a turning point in the estimated sound propagation, wherein the turning point is a distance in the direction of the acoustic receptor at which a noise level at the acoustic receptor becomes lower when the wake profiles are aligned with the sound propagation than when the wake profiles are misaligned with the sound propagation, optimizing the operation of the wind turbine comprising, estimating a noise level at the acoustic receptor, and re-optimizing the operation of the wind turbine if the estimated noise level at the acoustic receptor exceeds a threshold noise level. Wherein optimizing the operation of the wind turbine includes adjusting a yaw signal, wherein the yaw signal controls the yaw of a nacelle relative to the tower, and increasing a noise reduced operation (NRO) mode if the acoustic receptor is after the turning point.

In a third embodiment, a control system for a wind turbine includes communication circuitry, communicatively coupled to a network, configured to obtain weather data indicative of one or more weather conditions at the wind turbine, and a processor. The processor may be configured to access the weather data obtained by the communication circuitry, estimate wake profiles based on the obtained weather data, estimate far-field sound propagation in a direction toward an acoustic receptor based on the estimated wake profiles, wherein the acoustic receptor is disposed within a far-field range, generate a yaw signal, estimate a level of noise at the acoustic receptor, and modify the yaw adjustment signal if the noise level at the acoustic receptor exceeds a threshold noise level.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 shows a wind power plant having a plurality of the wind turbine systems shown in FIG. 1 in accordance with aspects of the present disclosure;

DETAILED DESCRIPTION

Figure 1:
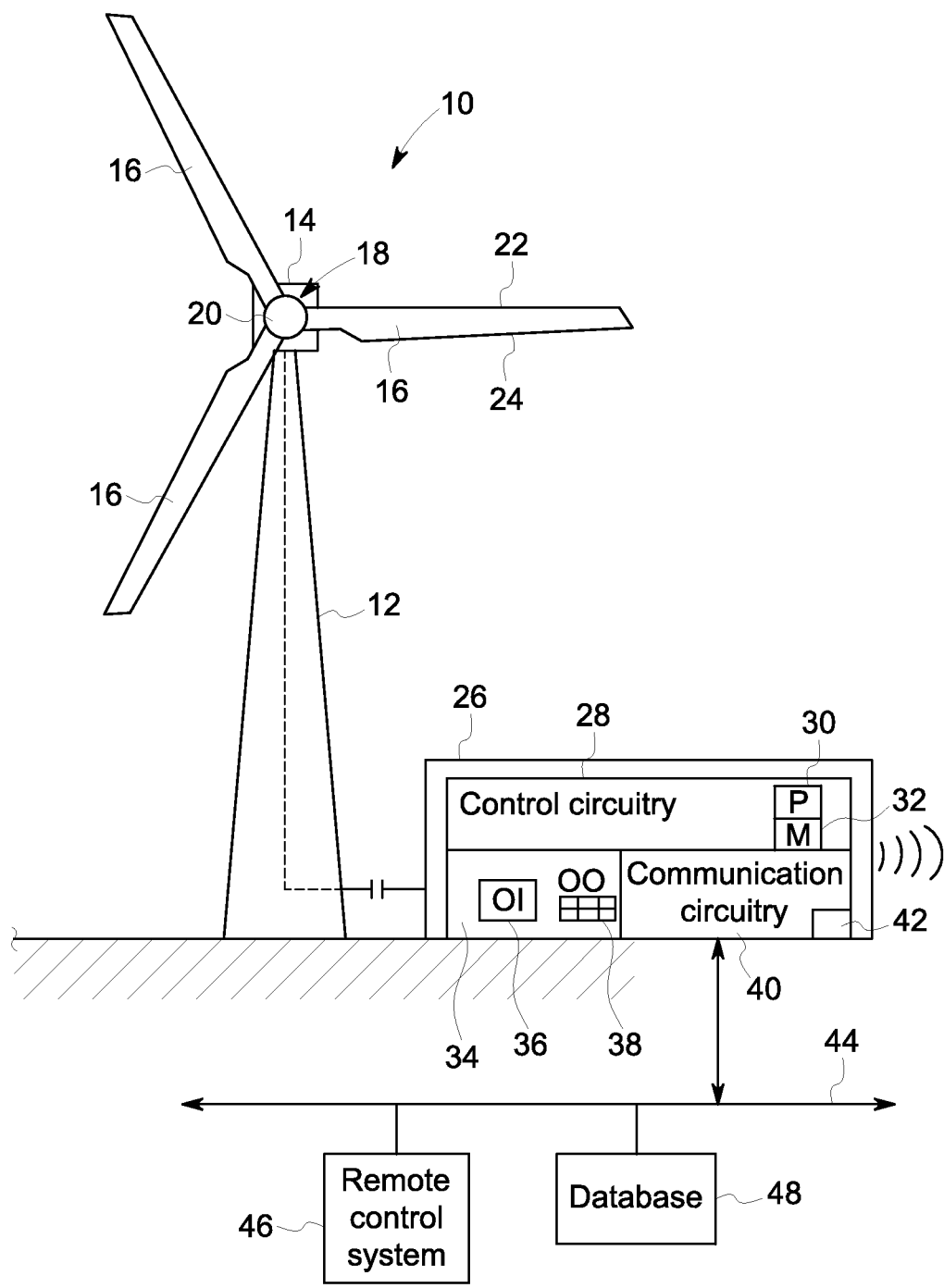
FIG. 1 shows a wind turbine system configured to convert wind energy into electrical energy in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Some wind turbine systems or wind power plants may be located near communities or other sites that are sensitive to noise. Due to local regulations, or the requests of nearby land owners, the operator of one or more wind turbine systems may desire to operate the wind turbine systems so as to keep the noise level at one or more far-field acoustic receptors attributable to the wind turbine systems below a threshold level. Operating a wind turbine system so as to reduce the amount of noise generated may result in a reduced amount of power produced.

The way sound propagates from a wind turbine may be affected by environmental conditions such as wind, temperature, atmospheric turbulence, terrain, etc. Additionally, wind turbines generate wake flows in the downwind direction as the turbine blades rotate and interact with the passing air flow. The wind turbine wake flow may also influence the sound propagation by changing the speed of sound propagation. Specifically, the wind turbine wake flow may affect the vertical wind profile, which in turn affects the speed at which sound travels. Generally, when the wake flow and noise propagation are aligned, noise levels increase. When wake flow and noise propagation are misaligned, noise levels decrease. It should be understood, however, that these are general trends (which will be addressed in more detail with regard to FIG. 5) and that there may be specific distances in specific directions at which this trend is reversed. Accordingly, the wake flow may influence the speed at which sound propagates from the wind turbine in a given direction. Because the wake flow varies as one moves away from the wind turbine, the effect of the wake flow on sound propagation also changes with the distance from the wind turbine. The techniques described herein may be used to control the wake effects of a wind turbine system, giving the operator the ability to affect noise propagation from the wind turbine system in a given direction.

By making yaw adjustments to a wind turbine, an operator can "steer" the wake flow to affect noise propagation. Such yaw adjustments may increase or decrease noise levels attributable to the wind turbine at a given noise sensitive site, depending upon its distance and direction from the wind turbine. If the operator makes yaw adjustments that direct the wake flow away from the noise sensitive site, then sound propagation through the wake flow in the direction of the noise sensitive site may be reduced. The operator may then operate the one or more wind turbine systems so that they produce more power than would otherwise be allowed, resulting in noise levels at the nearby community or noise sensitive site that are either the same or lower than they would otherwise be in similar power generation systems without the benefit of the present approaches.

FIG. 1 is a front view of a wind turbine system 10 configured to convert wind energy into electrical energy. The wind turbine system 10 includes a tower 12, a nacelle 14 and blades 16. The blades 16 are coupled to a generator 18 within the nacelle 14 by a hub 20 that rotates with the blades 16. The blades 16 are configured to convert the linear air flow from the wind into rotational motion. As the blades 16 rotate, the coupling between the hub 20 and the generator 18 within the nacelle 14 drives components of the generator 18 to rotate, thereby producing electrical energy. While three blades 16 are included in the wind turbine system 10 of the present embodiment, alternative embodiments may include more or fewer blades 16.

Each blade 16 includes a leading edge 22 and a trailing edge 24. The air flow engages the leading edge 22 and flows toward the trailing edge 24. Due to the shape of the blades 16, aerodynamic forces caused by the air flow induce the blades 16 to rotate, thereby driving the generator 18 to produce electrical power. Efficiency of the wind turbine system 10 is at least partially dependent upon converting linear air flow into rotational energy. Therefore, the blades 16 are generally configured to efficiently transfer wind energy into rotational motion. For example, blade shape may be selected to enhance air flow over the blade 16 such that aerodynamic forces induce the blade 16 to rotate. In addition, the blades 16 are typically manufactured to be substantially smooth, such that air flows over the blades 16 without interference.

The wind turbine system 10 may also include a controller 26 to control the operation of the wind turbine system 10. For example, the controller 26 may control the rotational speed (rpm) of the wind turbine system 10, the pitch of the blades 16, the yaw of the wind turbine system 10, as well as other parameters of operation. The controller 26 may include control circuitry 28, which may include a processor 30 and a memory component 32. The processor may be configured to analyze data, run programs, execute instructions, optimize operating parameters of the wind turbine system 10, and control the operating parameters of the wind turbine system 10. The memory component 32 may be any non-transitory computer readable medium. The memory component may store data, processor instructions, programs, optimization algorithms, lookup tables, models, and the like, including processor instructions for implementing the present approaches discussed herein.

The controller 26 may include or communicate with an operator interface 34. The operator interface 34 may include a display 36 and/or operator inputs 38. The display may be an LCD, a cathode ray tube display, or some other kind of display. In some embodiments, the display 36 may be an array of LEDs. The operator inputs 38 may include buttons, knobs, dials, and/or a keyboard and mouse. In some embodiments, the display 36 and the operator inputs 38 may be combined into a single element (e.g., a touchscreen). The operator interface 38 allows the wind turbine system 10 to communicate with and control the operator and the operator to communicate with the wind turbine system 10. Though the various components of the controller 26 are shown within a common unit or housing for purposes of illustration, in some embodiments the various components (e.g., control circuitry 28, processor 30, memory 32, operator interface 34, display 36, operator inputs 38, communication circuitry 40, etc.) maybe situated in more than one unit and/or location.

The controller 26 may also include communication circuitry 40. In some embodiments, the communication circuitry may facilitate communication between the controller and an operator (e.g. via a smart device) by wired or wireless communication. In some embodiments, the communication circuitry 40 may facilitate communication via a wireless or wired connection, through port 42, with a network 44. In some embodiments, a remote control system 46 and/or a database 48 may be in communication with the controller 26 via the network 44. The remote control system 46 may provide an operator with control of one or more wind turbine systems spread across one or more locations. The network 44 may also provide access to one or more a databases 48. The databases 48 may provide the controller 26 with lookup tables, noise propagation models, weather models, weather data, local noise regulations, desired threshold noise levels, and the like.

Figure 2A:
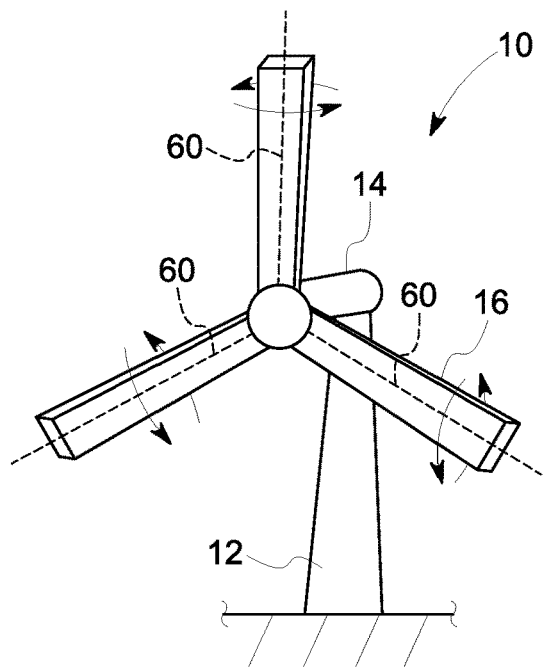
FIG. 2A shows pitch adjustment of a turbine blade in accordance with aspects of the present disclosure.
Figure 2B:
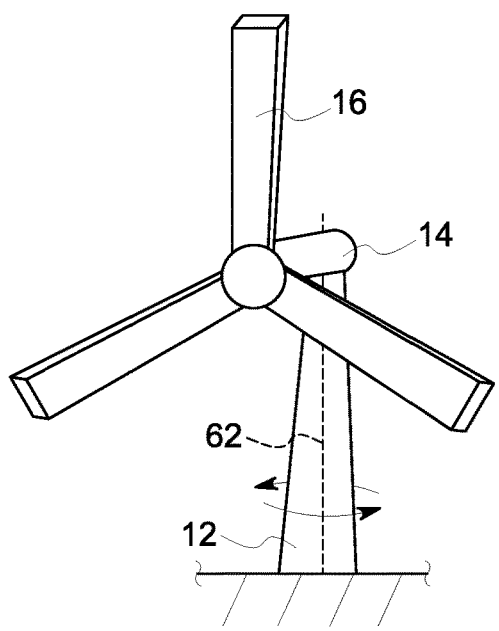
FIG. 2B shows yaw adjustment of a wind turbine system in accordance with aspects of the present disclosure.

The disclosed techniques may include management of noise propagation by adjusting the rotational velocity of the wind turbine system 10, the blade 16 pitch, and the yaw of the wind turbine system. The rotational velocity of the wind turbine system 10 is the speed at which the blades 16 and the hub 20 rotate as a result of the blades' 16 interaction with the wind. FIG. 2A shows blade 16 pitch adjustment. Blade pitch adjustments are made by rotating the blade about the blade axis 60, which runs the length of the blade. FIG. 2B shows wind turbine yaw adjustment. A yaw adjustment is made by rotating the nacelle about the tower axis 62, which extends the height of the tower 12.

With the foregoing discussion of a wind turbine system 10 in mind, FIG. 3 is a schematic diagram of a multitude of such wind turbine systems 10 disposed to function together as part of a wind power plant 80. Electrical currents produced by the wind turbine systems 10 of the wind power plant 80 are provided to an electrical power grid 82, thereby providing electrical energy to consumers connected to the grid 82. Further, one or more controllers 26 may be provided to control and/or monitor operation of the wind power plant 80. Such controllers 26 may be provided as general or special purpose computers (or other suitable processor-based systems) configured to execute code or routines that allow monitoring and/or control of the wind power plant 80 as a whole and/or of individual wind turbine systems 10 of the plant 80. For example, in one embodiment, a controller 26 (or other processor based system) may execute control logic to optimize performance, noise generation, noise propagation, and/or any number of other factors, as discussed herein. The disclosed techniques may be used to control more than one wind turbine system 10 (e.g., wind power plant 80) in order to control the noise propagation attributable to the more than one wind turbine system 10 or wind power plant 80 at a given location.

Figure 4A:
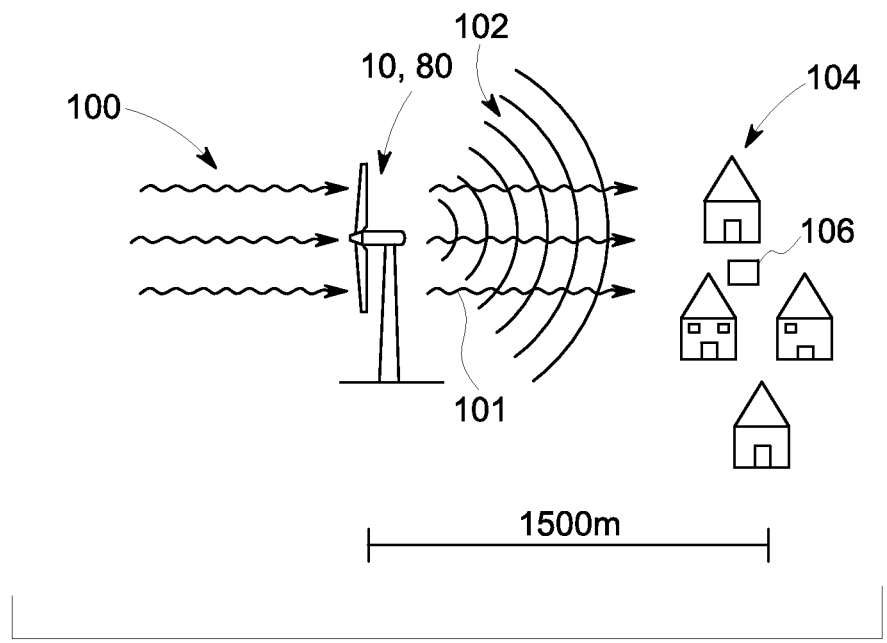
FIG. 4A shows a wind turbine system that is not using the disclosed techniques to direct the wake flow in accordance with aspects of the present disclosure.

FIG. 4A shows a wind turbine system 10, or wind power plant 80, that has not implemented the disclosed techniques for affecting sound propagation by misaligning the wake flow with the noise propagation in the direction of a noise sensitive site 104. In FIG. 4A, air 100 flows toward the wind turbine system 10, or wind power plant 80, and interacts with the blades 16, causing the blades 16 to spin. The blades 16 moving through the air 100 may generate a wake flow 101 and noise 102, which propagate away from the wind turbine system 10. In some embodiments, the sound 102 may propagate toward one or more noise sensitive sites 104, such as one or more nearby communities. When the wake flow 100 and the noise propagation 102 are aligned in the direction of the noise sensitive site 104, the sound may propagate with the wake flow. It should be understood that such noise sensitive sites 104 may represent any location or geographical area that may be sensitive to noise, including one or more residential, commercial, or industrial entities, or regions (e.g., housing, businesses, and so forth) as well as environmentally sensitive sites. For example, such a site 104 or entity may include a place where one or more people live, a school, an office, a park, a ranch, a farm, a wilderness preserve, etc. In some embodiments, one or more acoustic receptors 106 may be disposed in or near the sensitive sites 104 in order to monitor noise levels in the site 104. Though FIG. 4A shows a single site 104 in the form of housing, it should be understood that in some embodiments, the wind turbine system 10, or wind power plant 80, may be located near multiple sensitive sites 104. As such, the present techniques may be used to control the wake flow 101 so as to control noise levels due to the wind turbine system 10 at multiple neighboring sites.

Figure 4B:
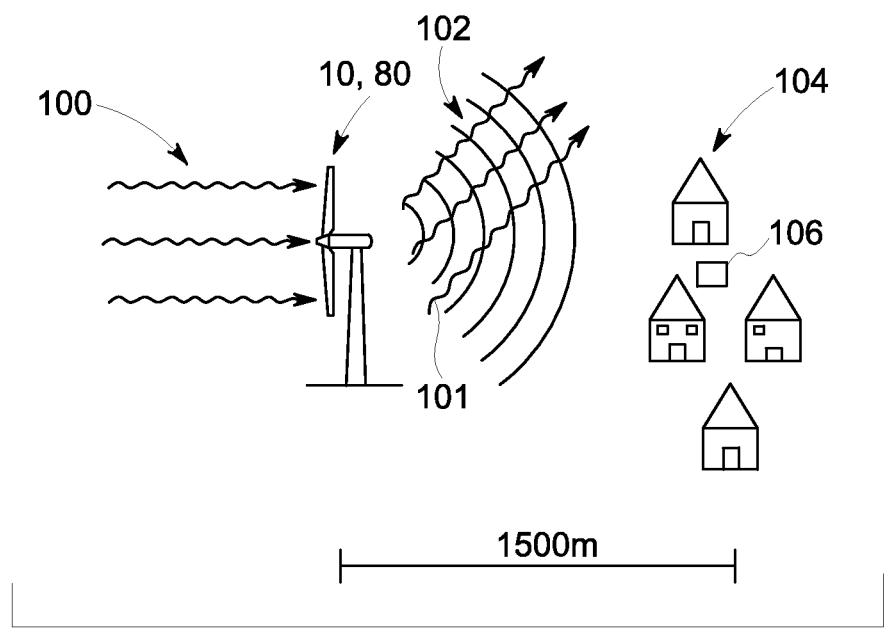
FIG. 4B shows a wind turbine system that uses the disclosed techniques to direct the wake flow in accordance with aspects of the present disclosure.

FIG. 4A shows that the sensitive site 104 is located approximately 1500 m away from the wind turbine system 10. It should be understood, however, that this distance is merely an example and intended to communicate that the disclosed techniques are concerned with far field sound propagation. In general, far-field range is the distance from the wind turbine system 10 at which the environmental effects (e.g., wind, temperature, atmosphere) have a non-negligible effect on sound propagation. For near field range, environmental effects are negligible. Though there are many different ways to determine where far-field range begins, for the sake of simplicity, it is assumed that far-field range begins at approximately 450 to 500 meters from the nearest wind turbine system. FIG. 4B shows a wind turbine system 10, or wind power plant 80, that is implementing the disclosed wake management techniques to misalign the wake flow and the sound propagation 102 in the direction of the sensitive site 104. As will be described in more detail later, the controller 26 of the wind turbine system 10 may adjust one or more of the rotational velocity (rpm) of the wind turbine system 10, the yaw of the wind turbine system 10, or the pitch of the blades 16 in order to manage the wake effects and misalign the wake flow 101 and the sound propagation. Local regulations or the wishes of residents in the site 104 may require that noise levels in the site due to the wind turbine system 10 or wind power plant 80 stay below a threshold level. In the embodiment shown in FIG. 4A, in which the wake flow 101 and the noise propagation 102 are aligned in the direction of the site 104, noise reduced operation (NRO) may be used to reduce the overall noise produced by the wind turbine system 10. NRO techniques typically include adjustment of the blade 16 pitch or the rotational velocity of the wind turbine system 10. NRO techniques may reduce the amount of power generated by the wind turbine system 10.

By adjusting the yaw of the wind turbine system 10, in addition to the rotational speed and the blade pitch, to misalign the noise propagation 102 and the wake flow 101 in the direction of the site 104, as shown in FIG. 4B, the controller 26 may adjust the settings of the wind turbine system 10 to reduce noise levels at the site 104 as compared to the situation in FIG. 4A or generate more noise (and more power) than would be allowable in the situation shown in FIG. 4A, and still comply with local regulations. The controller 26 in the example shown in FIG. 4B may then steer the wake flow 101 such that it is misaligned with the noise propagation 102 in the direction of the noise sensitive site 104, resulting in the noise level sensed at the acoustic receptor 106 being the same or less than the noise sensed in the example shown in FIG. 4A. As such, the disclosed techniques may allow the wind turbine system 10 to generate more power without an increase in the noise sensed by nearby sensitive sites 104.

Figure 5:
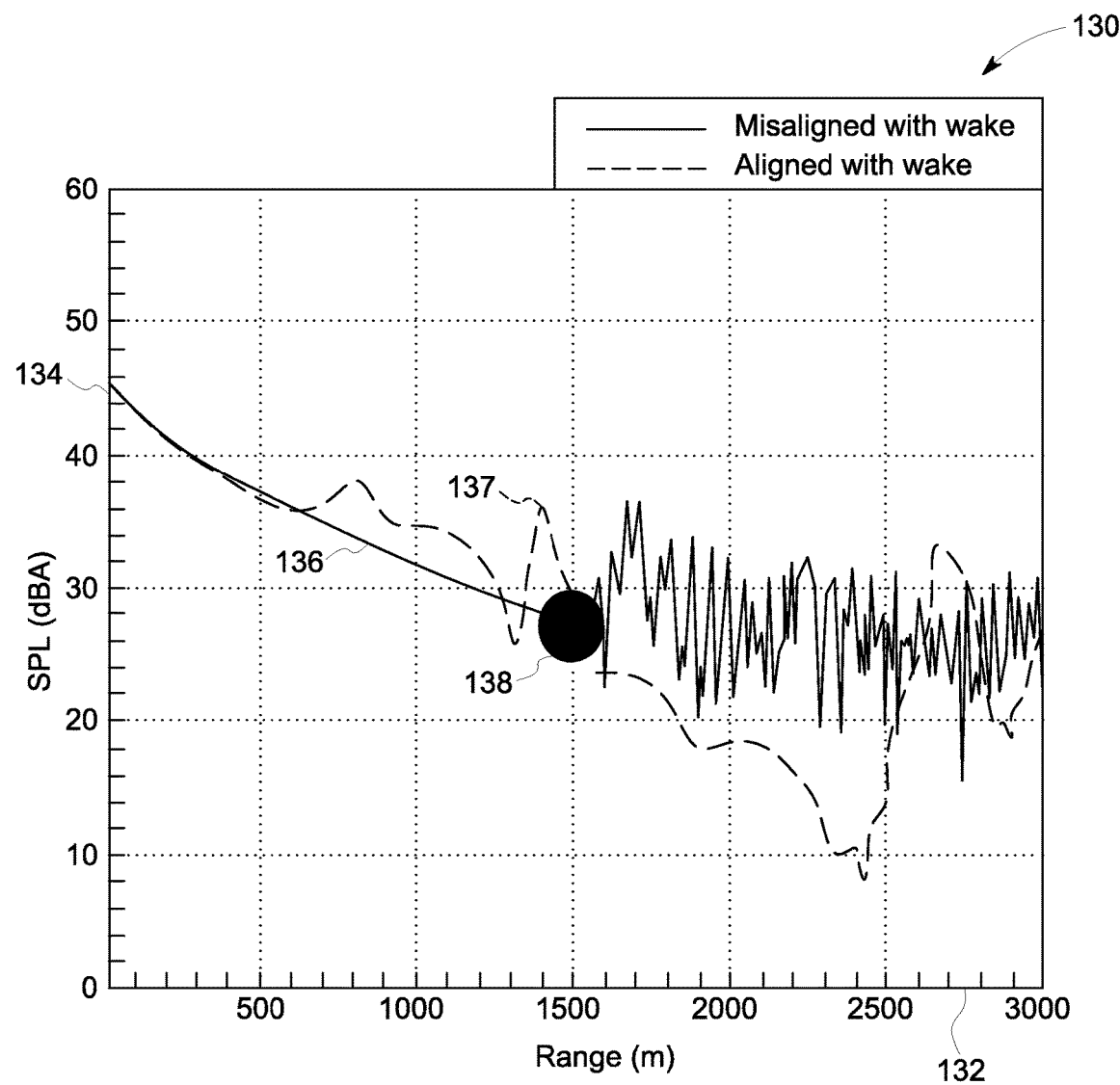
FIG. 5 is a sample plot of sound pressure level in the direction of an acoustic receptor plotted against range when the wake flow and the sound propagation are aligned and misaligned in accordance with aspects of the present disclosure.

FIG. 5 shows a sample plot 130 of the sound pressure level (SPL) in the direction of an acoustic receptor when the wake flow is aligned with sound propagation and when the wake flow is misaligned with sound propagation. The x-axis 132 represents the range, in meters, from the wind turbine system 10. The y-axis represents SPL in A-weighted decibels (dBA). Curve 136 shows the SPL when the wake flow and sound propagation are misaligned, as shown in FIG. 4B. Curve 137 shows the SPL when the wake flow and sound propagation are aligned, as shown in FIG. 4A. Curves 136 and 137 are the SPL in dBA at the given range from the wind turbine system 10, in the direction of interest (e.g., the direction from the wind turbine system 10 to the site 104 or acoustic receptors 106). Note that between 0 and 1500 m, the SPL is generally lower when the wake flow and sound propagation are misaligned. Between about 1500 m and 2500 m, the SPL of curve 137 (wake flow and sound propagation aligned) is lower than the SPL of curve 136 (wake flow and sound propagation misaligned). Accordingly, in the specific example of FIG. 5, a noise sensitive site 104 located between 1500 m and 2500 m from the wind turbine system 10 will likely experience lower noise levels when the wake flow and sound propagation are aligned. The distance at which this change occurs, that is, the distance in the down wind direction at which the effect of an aligned wake flow on the noise levels at the site 104 changes relative to the misaligned condition, is called the turning point 138. If the point of interest (acoustic receptor 106 or site 104) is before the turning point, yaw adjustment or reduction of NRO modes may be useful in controlling the sound propagation. If the point of interest (acoustic receptor 106 or noise sensitive site 104) is after the turning point, an increase of NRO modes may be useful to increase the power output of the wind turbine while still meeting noise regulations.

Figure 6:
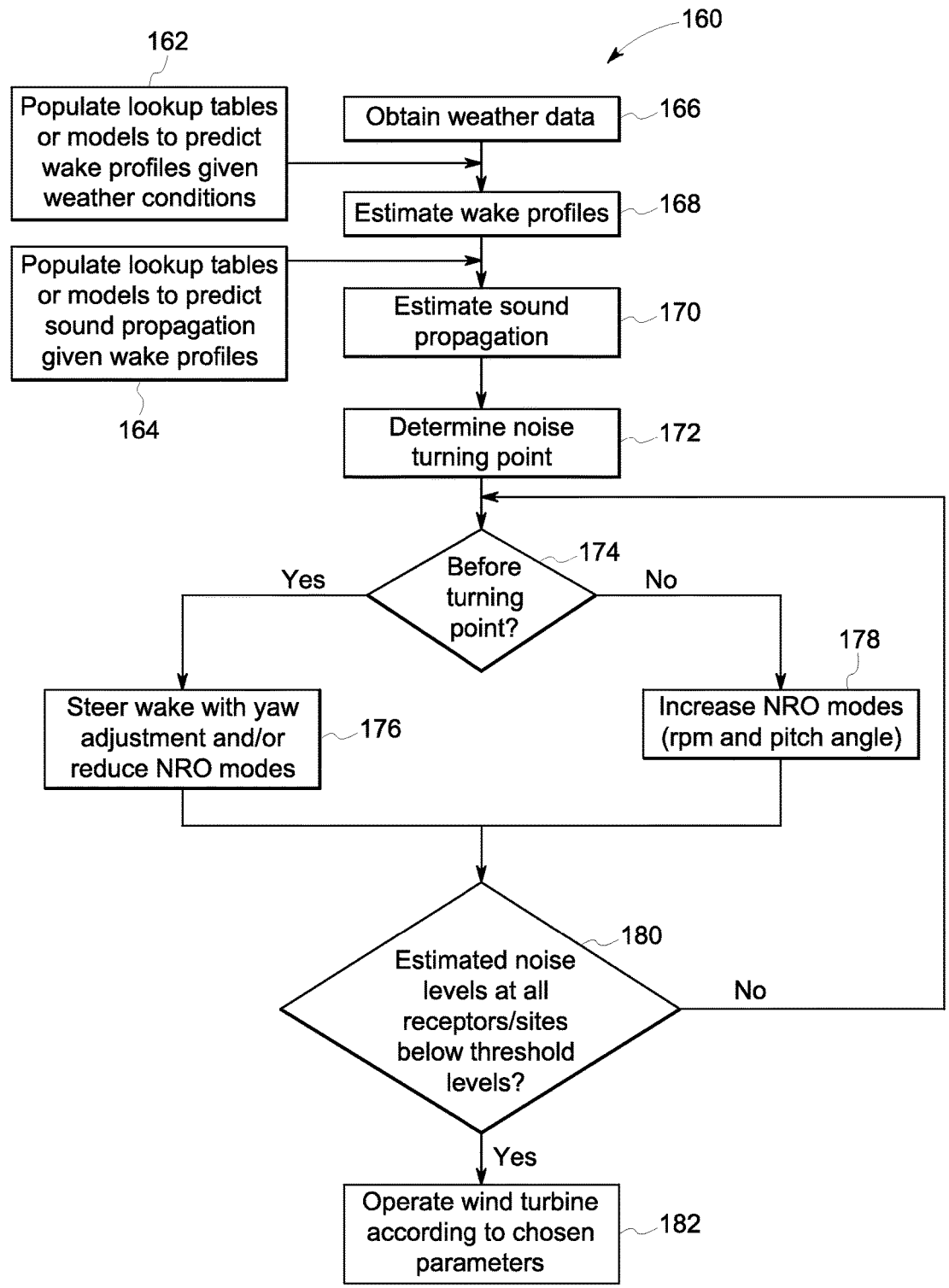
FIG. 6 is a flow chart for a process for maintaining noise levels at a given location by controlling the wake effects in accordance with aspects of the present disclosure.

FIG. 6 is a flow chart of a process 160 for maintaining the noise levels at a given location by controlling the wake effects of one or more wind turbine systems 10. At some point prior to implementing the disclosed techniques, lookup tables or models for the wake profiles and sound propagation are generated or updated. This may be done at any point before attempting to control the noise propagation of a given wind turbine system 10 (e.g., hours, days, weeks, months, or years before attempting to control the noise propagation of a given wind turbine system 10). The one or more lookup tables or models may be stored locally or remotely from a given wind turbine system, such as in the memory 32 of the controller 26, by the remote control system 46, or the database 48. The one or more lookup tables or models may be updated manually, remotely, or by software update.

In block 162, the one or more lookup tables or models are populated or updated that predict wake profiles based on given weather conditions. In some embodiments, the weather conditions may include wind shear, wind speed, temperature, humidity, barometric pressure, any combination thereof, or other weather conditions. The lookup tables or models may be populated using data determined experimentally, by model, some mixture of the two, or some other way. For example, given the distance and direction of an acoustic receptor, as well as the local weather conditions, a lookup table or model may generate an estimation of the wake profiles for various weather conditions.

In block 164, the one or more lookup tables or models are populated or updated that predict sound propagation based on the given wake profiles. For example, given the wake profiles output from the lookup tables or models populated in block 162, the frequency, and the direction of the sensitive sites 104 or acoustic receptor 106 of interest, the lookup table may output an equation, table, or graph of the SPL versus distance, similar to the plot shown in FIG. 5. In some embodiments, a single lookup table or model may be used to predict both wake profiles and sound propagation based upon weather data, effectively combining blocks 162 and 164 into a single block.

In block 166, the process 160 obtains current or predicted weather data, which may be indicative of one or more weather conditions surrounding the wind turbine system 10. The weather data may be accessed from the remote control system 46, from the database 48, or pulled from the internet via the network 44. The weather data may be updated periodically, and thus may be obtained by the process 160 once a minute, once every 5 minutes, once every 15 minutes, once every 30 minutes, once an hour, once every 2 hours, or 2, 4, 6, 8, or 10 times a day, or any time interval greater than, less than, or in between the listed intervals. Alternatively, the weather data may also be obtained upon receipt of a manual update instruction, such as when instructed by an operator. In some embodiments, the process 160 may be configured to obtain weather data more frequently when the weather is subject to sudden changes (e.g., when a front is forecast to pass the wind turbine system 10). The weather data may include wind shear, wind speed, wind direction, temperature, humidity, barometric pressure, or any other weather data.

In block 168 the process 160 estimates the wake profiles of the air 100 after interacting with the blades 16 of the wind turbine system 10. In some embodiments, the weather data obtained by the process 160 in block 166 is plugged into the one or more lookups table populated in block 162 using experimental data, models, or some other method. In other embodiments, the weather data obtained by the process 160 in block 166 is fed into one or more models in order to estimate the wake profiles. In some embodiments, the model or lookup table may be based solely on weather data. In other embodiments, the model or lookup table may consider the rotational velocity (rpm) of the wind turbine system 10, the pitch of the blades, or other operational parameters of the wind turbine system 10. For example, given the distance and direction of an acoustic receptor, as well as the local weather conditions, the lookup table or model may generate an estimation of the wake profiles.

In block 170, the wake profiles derived in block 168 are used to estimate the sound propagation from the wind turbine system 10. As previously mentioned, in some embodiments, the wake profiles and the sound propagation may be estimated using a single lookup table or model, effectively combining blocks 168 and 170. In some embodiments, block 170 may produce a two or three dimensional map or prediction to determine how the sound of the wind turbine system propagates from the wind turbine system. In other embodiments, block 170 may only consider the sound propagation at one or more acoustic receptors 106, sensitive sites 104, or other points of interest. For example, given the wake profiles output from the lookup tables or models populated in block 162, as well as the direction of the site 104 or acoustic receptor 106 of interest, the lookup table may output an equation, table, or graph of the SPL versus distance, similar to the plot shown in FIG. 5.

In block 172, the process 160 determines the noise turning point 138. As was discussed with regard to FIG. 5, the turning point 138 may be determined by examining the SPL in a given direction (e.g., the direction of the site 104 or acoustic receptors 106) at far-field distances from the wind turbine system 10, or by comparing noise levels when the wake flow and the sound propagation are aligned and misaligned. As can be seen in FIG. 5, the turning point is the distance in the down wind direction at which the effect of the aligned wake flow on the noise levels at the site 104 changes relative to the misaligned wake flow. In block 172, the process 160 determines the range at which the turning point 138 occurs.

At decision 174, the process 160 determines whether the acoustic receptor 106 or site 104 of interest is inside of the turning point 138 range. That is, if the turning point 138 occurs at a known distance from the wind turbine system 10, is the acoustic receptor 106 or site 104 of interest inside of that distance or outside of that distance? If the acoustic receptor 106 or site 104 of interest is inside the turning point 138, the process 160 moves to block 176, wherein the process 160 directs the wake flow with yaw adjustments, and/or reduces NRO modes. In some embodiments, the yaw adjustment may be in increments of 0.1 degrees, 0.5 degrees, 1 degrees, 2 degrees, 5 degrees, or 10 degrees, or any other increment. By making yaw adjustments to the wind turbine system 10, the process 160 may adjust the angle at which the wind 100 hits the blades 16, which in turn affects the wake profiles. Thus, by making yaw adjustments to the wind turbine system 10, the process 160 or the controller 26 may misalign the wake flow and the noise propagation in the direction of the site 104 or acoustic receptor of interest, which may reduce the noise level. In some embodiments, block 176 may include the act of the processor 30 generating or modifying a yaw signal, an rpm signal, or a blade pitch signal.

If, on the other hand, the acoustic receptor 106 or site 104 of interest is outside of the turning point 138 distance, the process 160 moves to block 178 and increases the Noise Reduced Operation (NRO) modes in order to increase the power of the wind turbine system while still maintaining noise levels at the acoustic receptor 106 or site 104 of interest below required levels. Increasing NRO modes may include adjustments to the rotational velocity (rpm) of the wind turbine system 10 and the pitch angle of the blades 16. In some embodiments, block 178 may include the act of the processor 30 generating or modifying an rpm signal or a blade pitch signal.

For example, assume a wind turbine system 10 is located 1500 meters from a city with noise regulations requiring that the audible noise from the wind turbine system 10 at a given acoustic receptor 106 not exceed 30 dBA. Without making yaw adjustments, the operator of the turbine would likely adjust NRO modes, which would limit the noise (and likely the power) produced by the wind turbine system, without any ability to direct the wake flow and misalign the wake flow and the sound propagation, such that the acoustic receptor within the city measures less than 30 dBA. However, by using yaw adjustments to steer the wake flow, the operator may run the turbine to produce more noise (and likely more power), and then misalign the wake flow and noise propagation, such that the noise level at the relevant acoustic receptor 106 attributable to the wind turbine is below 30 dBA. In such an embodiment, for example, a similar location 1500 meters away in the direction in which the wake flow and the sound propagation are aligned, may experience a sound level of 60 dBA. Because there is no sound sensitivity at this location, it is not an issue for the wind turbine system 10 operator. Accordingly, the combination of making yaw adjustments and adjusting NRO modes, allows an operator to run one or more wind turbine systems 10 to produce more noise, and likely more power, than would otherwise be allowed, and then direct the noise away from the sensitive area.

Whether the acoustic receptor 106 or site 104 of interest is located before or after the turning point 138, the process moves to decision 180 and estimates the noise levels at the one or more acoustic receptors 106 or sites 104 of interest. If the estimated noise levels are below the threshold levels, the process 160 operates the wind turbine system 10 according to the parameters determined in block 176 or 178 until new weather data is available or until it is time to obtain new weather data. In some embodiments, if the estimated noise levels are not below the threshold levels, the process 160 may optimize by returning to block 174. The process 160 may be configured to return to block 174 for reoptimization whenever reoptimization is needed, or when only small tweaks to the wind turbine system 10 are needed.

In some embodiments, if the estimated noise levels are above the threshold levels, the process 160 re-optimizes by returning to block 168 where the wake profiles are recalculated based on the new operating parameters determined in blocks 176 and 178. Some embodiments may be configured to re-optimize by returning to block 168 each time through the process 160. Other embodiments may return to block 168 when block 176 or block 178 results in substantial changes (e.g., above a threshold) to rotational velocity, blade pitch, or yaw. The process 160 may then proceed to recalculating the sound propagation (block 170), determining the noise turning point (block 172), and making adjustments to the wind turbine system (blocks 176 and 178). The process 160 then recalculates whether the estimated noise levels at the one or more acoustic receptors 106 or sites 104 of interest are below the threshold levels. If the estimated noise levels are not below the threshold levels, the process 160 may go through the optimization process again. If the estimated noise levels are below the threshold levels, the process 160 runs the wind turbine system 10 according to the parameters determined in blocks 176 and 178 until new weather data is available or until it is time to obtain new weather data.

For clarity, FIG. 6 shows an embodiment for steering the wake flow of a single wind turbine system relative to sound propagation in the direction of a single noise sensitive site 104 or acoustic receptor 106. It should be understood, however, that the same techniques may be used to control more than one wind turbine systems 10 (e.g., a wind power plant) and/or to steer wake flows to align or misalign the wake flow relative to sound propagation in the direction of multiple noise sensitive sites 104 or acoustic receptors 106.

The techniques described herein may be used to direct or steer the wake flows of one or more wind turbine systems to affect noise propagation in the direction of nearby communities or sites that are sensitive to noise. Using these techniques, an operator of one or more wind turbine systems may operate the one or more wind turbine systems to generate more noise (and likely more power) than would otherwise be possible, and then reduce the noise at the community or noise sensitive site such that the noise attributable to the one or more wind turbine systems, as perceived from the community, does not increase.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of controlling a wind turbine comprising:
obtaining weather data indicative of one or more weather conditions at the wind turbine;
estimating wake profiles based on the obtained weather data;
estimating far-field sound propagation in a direction of a noise sensitive site based on the estimated wake profiles;
identifying a turning point in the far-field estimated sound propagation, wherein the turning point is a distance in the direction of the noise sensitive site at which the noise level at the noise sensitive site becomes lower when the wake profiles are aligned with the sound propagation than when the wake profiles are misaligned with the sound propagation;
generating a yaw signal, wherein the yaw signal controls the yaw of a nacelle relative to a tower of the wind turbine;
estimating a noise level at the noise sensitive site; and
adjusting the yaw signal if the estimated noise level at the noise sensitive site exceeds a threshold noise level.

2. The method of claim 1, wherein estimating wake profiles is done using a first lookup table, and estimating far-field sound propagation is done using a second lookup table.

3. The method of claim 1, further comprising:
generating a blade pitch signal, wherein the blade pitch signal controls the pitch of a plurality of blades of the wind turbine;
generating an rpm signal, wherein the rpm signal controls a rotational velocity of the plurality of blades about a hub; and
adjusting one or both of the blade pitch signal and the rpm signal if the estimated noise level at the noise sensitive site exceeds the threshold noise level.

4. The method of claim 1, wherein the weather data comprises wind shear.

5. The method of claim 1, comprising:
reducing a noise reduced operation (NRO) mode if the noise sensitive site is before the turning point; and
increasing the NRO mode if the noise sensitive site is after the turning point.

6. The method of claim 1 wherein the noise sensitive site comprises one or more acoustic receptors configured to sense the noise level at the noise sensitive site.

7. A method of controlling a wind turbine comprising:
obtaining weather data indicative of one or more weather conditions at the wind turbine;
estimating wake profiles based on the obtained weather data;
estimating sound propagation in a direction of an acoustic receptor based on the estimated wake profiles;
identifying a turning point in the estimated sound propagation, wherein the turning point is a distance in the direction of the acoustic receptor at which a noise level at the acoustic receptor becomes lower when the wake profiles are aligned with the sound propagation than when the wake profiles are misaligned with the sound propagation;
optimizing the operation of the wind turbine comprising:
adjusting a yaw signal if the acoustic receptor is before the turning point, wherein the yaw signal controls the yaw of a nacelle relative to the tower; and
increasing a noise reduced operation (NRO) mode if the acoustic receptor is after the turning point;
estimating the noise level at the acoustic receptor; and
re-optimizing the operation of the wind turbine if the estimated noise level at the acoustic receptor exceeds a threshold noise level.

8. The method of claim 7, wherein optimizing the operation of the wind turbine comprises one or both of:
adjusting a blade pitch signal, wherein the blade pitch signal controls the pitch of a plurality of blade of the wind turbine; and
adjusting an rpm signal, wherein the rpm signal controls a rotational velocity of the plurality of blades about a hub.

9. The method of claim 7, wherein optimizing the operation of the wind turbine comprises reducing the NRO mode if the acoustic receptor is before the turning point and increasing the NRO mode if the acoustic receptor is after the turning point.

10. The method of claim 7, wherein estimating wake profiles and estimating sound propagation includes using one or more lookup tables.

11. The method of claim 7 wherein the weather data comprises wind shear, temperature profile, or some combination thereof.

12. The method of claim 7, wherein adjusting the yaw signal is configured to direct the wake flow away from the acoustic receptor.

* * * * *